Reissued Mar. 19, 1929. Re. 17,240

UNITED STATES PATENT OFFICE.

EDWARD F. KENNEY, OF BETHLEHEM, PENNSYLVANIA, ASSIGNOR TO BETHLEHEM STEEL COMPANY, A CORPORATION OF PENNSYLVANIA.

HEAT TREATMENT OF RAILWAY RAILS.

No Drawing. Original No. 1,619,025, dated March 1, 1927, Serial No. 104,224, filed April 23, 1926. Application for reissue filed February 2, 1929. Serial No. 337,169.

My invention relates to the heat treatment of rails.

It consists essentially in hardening the object by rapidly cooling it from a temperature above to a temperature below the critical range, and then, before the object has cooled to a temperature as low as the blue-heat zone, maintaining it at a temperature between the critical range and the blue-heat zone to thoroughly equalize the temperature, after which it may be cooled to atmospheric temperatures.

This treatment applied to rails greatly enhances those properties which make for strength and wear resistance without producing serious strains or stresses in the metal.

My invention may be best illustrated by setting forth several specific examples.

Rails of the following composition, carbon .63 to .87, manganese .60 to .90, phosphorus .03, sulphur .05, and silicon .15 to .25 were quenched in water for about thirty seconds from a temperature about 1750° F., cooling it to a temperature below the critical range but above the blue heat range. The rails were then charged immediately into a furnace maintained at 1000° F. for equalizing the temperature. They were kept at this temperature one hour and then removed from the furnace and allowed to cool in the air. Under the drop test these rails were tougher than the regular rail which has not been quenched and they showed no sign of ruptures.

Rails of the following composition:

| Carbon. | Manganese. | Phosphorus. | Sulphur. | Silicon. |
|---|---|---|---|---|
| .62 | 1.32 | .023 | .044 | .16 |
| .72 | 1.43 | .022 | .042 | .19 |
| .68 | .72 | .023 | .062 | .13 |
| .72 | .79 | .024 | .060 | .19 |
| .74 | .69 | .023 | .049 | .26 |
| .86 | .81 | .023 | .057 | .22 |

were also treated by quenching from a temperature of 1550° F., the quenching stopped before the blue-heat zone was reached, and immediately equalized at 900° F. before the temperature had dropped to the blue-heat range.

Extensive tests were made upon these rails, including drop tests, Brinell hardness tests, Izod impact tests, and macroscopic and microscopic examinations. The physical properties were greatly improved and no signs of internal ruptures found.

On the other hand, when rails of the same compositions were quenched in the same way but without being given the equalization treatment between the critical range and the blue-heat zone, the metal structure was found to be badly ruptured.

For example, some of the rails were quenched from a temperature of 1750° in water for two minutes, bringing them nearly to atmospheric temperature. These rails broke into a number of fragments before they were removed from the quenching tank.

Again, rails were quenched in water from a temperature of 1750° F. for thirty seconds and then allowed to cool in air, there being no equalization treatment. These rails cracked in cooling and when cut up and examined macroscopically and microscopically were found to be badly ruptured internally as well as externally.

It is economically advantageous to carry out my process in connection with the mechanical working. For example, in the manufacture of rails after leaving the rail mill and while still in a heated condition, they are passed into a suitable equalizing chamber where they are brought to a uniform temperature above the critical range. This equalizing chamber will, of course, be maintained at the desired temperature by any suitable heating means. After being equalized the rails are quenched to a temperature below the critical range but above the blue-heat zone. Without allowing them to cool below the blue-heat zone they are immediately charged into a furnace kept at a temperature preferably between 800° and 1100° F. and kept there until the temperature is thoroughly equalized. Then, after straightening, they are allowed to cool to atmospheric temperature. Of course, all the details here mentioned are not always essential. For example, the equalizing before the quenching may be omitted.

The choice of temperature for equalizing, after the quenching operation, varies with the particular combination of hardness and toughness desired.

What I mean by the "blue-heat zone", as this expression is used in this disclosure, is that range of temperatures, below the critical range where steels in heating markedly increase in tensile strength and the elastic limit, and also markedly decrease in ductility. At temperatures, within this range, most steels when exposed to air take on a blue color, due to oxidation, but since, with some steels, this color is not readily apparent, I do not wish to be limited to the color as a means of determining or defining this zone.

By the expression "critical range" I mean that temperature range through which the steel must be cooled to effect a hardening thereof. This range will vary with the particular composition of the steel, the various ranges according to different carbon contents being in the common nomenclature, $A_1$, $A_{3-2}$, and $A_{3-2-1}$.

In saying that the cooling is not allowed to go to the blue heat zone prior to equalization it is of course meant that the major mass of the metal does not reach the blue heat zone. Obviously in any effective quench of an object certain portions of the metal of the object may drop to temperatures relatively low with respect to the main mass of the object. The important thing here is to keep such an amount of metal from cooling to the blue heat zone before equalization as to avoid dangerous internal stresses and strains in the object.

Having thus described the invention what I claim as new and desire to secure by Letters Patent is:

1. The process of heat treating a rail which consists in rapidly cooling it from a temperature above to a temperature below the critical range, then equalizing at a temperature below the critical range but before the object has cooled to the blue-heat zone, and then cooling to atmospheric temperature.

2. The process of making a rail, consisting in mechanically shaping the steel, in cooling rapidly from above to below the critical range before the object has lost the heat incidental to shaping, equalizing at a temperature between the critical range and the blue-heat zone before the object has cooled to the blue-heat zone, and cooling to atmospheric temperature.

3. The process of heat treating a rail which comprises rapidly cooling it by means of an aqueous medium from a temperature above to a temperature below the critical range, then equalizing at a temperature below the critical range but above the blue-heat zone before the rail head has cooled to the blue-heat zone.

4. The process of heat treating a rail which consists in rapidly cooling it by means of an aqueous medium from a temperature above to a temperature below the critical range, then equalizing at a temperature below the critical range but before the object has cooled to the blue-heat zone, and then cooling to atmospheric temperature.

EDWARD F. KENNEY.